United States Patent
Hao et al.

(10) Patent No.: US 12,433,773 B2
(45) Date of Patent: Oct. 7, 2025

(54) COBALT-CHROMIUM ALLOY STENT AND DRUG ELUTING STENT

(71) Applicant: AmsinoMed Medical Co., Ltd, Beijing (CN)

(72) Inventors: Dongyun Hao, Beijing (CN); Bo Yu, Beijing (CN); Kefei Dou, Beijing (CN); Xin Shen, Beijing (CN); Bili Zhang, Beijing (CN); Fugui He, Beijing (CN); Lifeng Zhou, Beijing (CN); Xiaoyi Ma, Beijing (CN)

(73) Assignee: AMSINOMED MEDICAL CO., LTD, Beijing (CN)

( * ) Notice: Subject to any disclaimer, the term of this patent is extended or adjusted under 35 U.S.C. 154(b) by 0 days.

(21) Appl. No.: 19/023,216

(22) Filed: Jan. 15, 2025

(65) Prior Publication Data

US 2025/0152387 A1 May 15, 2025

Related U.S. Application Data

(63) Continuation of application No. PCT/CN2023/118673, filed on Sep. 14, 2023.

(30) Foreign Application Priority Data

Oct. 26, 2022 (CN) .......................... 202211315994.7

(51) Int. Cl.
  *A61F 2/89* (2013.01)
  *A61F 2/88* (2006.01)
  (Continued)

(52) U.S. Cl.
  CPC .................. *A61F 2/88* (2013.01); *A61F 2/89* (2013.01); *A61L 31/022* (2013.01); *A61L 31/10* (2013.01);
  (Continued)

(58) Field of Classification Search
  CPC ................ A61F 2/89; A61F 2220/0041; A61F 2220/0075; A61F 2/915; A61F 2250/0007;
  (Continued)

(56) References Cited

U.S. PATENT DOCUMENTS 5,163,953 A * 11/1992 Vince ..................... A61F 2/2418
  623/2.11
5,824,040 A * 10/1998 Cox .......................... A61F 2/90
  623/1.35

(Continued)

FOREIGN PATENT DOCUMENTS

| CN | 1413594 | 4/2003 |
| CN | 1657023 A | 8/2005 |

(Continued)

OTHER PUBLICATIONS

Translation of WO/0016718 (Year: 2000).*

(Continued)

*Primary Examiner* — Brian E Pellegrino
(74) *Attorney, Agent, or Firm* — Hoffman Warnick LLC

(57) ABSTRACT

A cobalt-chromium alloy stent comprising several main body units, wherein each main body unit is composed of several supporting rings connected by flexible ribs and the adjacent main body units are connected by several connecting ribs. A drug eluting stent comprising the cobalt-chromium alloy stent and a drug coating containing arsenic trioxide and tacrolimus. The drug release curves of the two composite drugs of arsenic trioxide and tacrolimus used in the present invention are adjusted, so that the inflammatory response of vascular endothelial cells and the proliferation behavior of vascular smooth muscle cells are effectively inhibited, and the vascular restenosis rate is reduced.

9 Claims, 13 Drawing Sheets

(51) Int. Cl.
*A61L 31/02* (2006.01)
*A61L 31/10* (2006.01)
*A61L 31/16* (2006.01)

(52) U.S. Cl.
CPC ....... *A61L 31/16* (2013.01); *A61F 2210/0076* (2013.01); *A61F 2220/0033* (2013.01); *A61F 2240/001* (2013.01); *A61F 2250/0067* (2013.01); *A61L 2300/102* (2013.01); *A61L 2300/216* (2013.01); *A61L 2300/41* (2013.01); *A61L 2300/416* (2013.01); *A61L 2300/606* (2013.01); *A61L 2420/02* (2013.01); *A61L 2420/06* (2013.01)

(58) Field of Classification Search
CPC ................ A61F 2/82; A61F 2210/0057; A61F 2250/0018; A61F 2250/0029; A61F 2/885; A61F 2/88; A61L 31/022
USPC ........................................................ 623/1.16
See application file for complete search history.

(56) References Cited

U.S. PATENT DOCUMENTS

| | | | |
|---|---|---|---|
| 2003/0195609 A1* | 10/2003 | Berenstein | A61F 2/88 623/1.15 |
| 2005/0273156 A1* | 12/2005 | Burgermeister | A61L 31/022 623/1.15 |
| 2008/0004690 A1* | 1/2008 | Robaina | A61F 2/915 623/1.42 |
| 2017/0281832 A1* | 10/2017 | Ramzipoor | A61F 2/915 623/1.15 |
| 2020/0384161 A1 | 12/2020 | Xu | |
| 2021/0393860 A1 | 12/2021 | Lee et al. | |
| 2024/0398593 A1 | 12/2024 | Ren | |

FOREIGN PATENT DOCUMENTS

| | | | |
|---|---|---|---|
| CN | 101161300 | 4/2008 | |
| CN | 101327343 | 12/2008 | |
| CN | 101601616 | 12/2009 | |
| CN | 203763305 U | 8/2014 | |
| CN | 108670510 | 10/2018 | |
| CN | 109330753 | 2/2019 | |
| CN | 109431664 | 3/2019 | |
| CN | 210962161 | 7/2020 | |
| CN | 113599036 A | 11/2021 | |
| CN | 114159197 A | 3/2022 | |
| CN | 115382027 A | 11/2022 | |
| WO | WO-0016718 A1 * | 3/2000 | ............... A61F 2/91 |
| WO | 02053066 | 7/2002 | |

OTHER PUBLICATIONS

PCT International Search Report for Application No. PCT/CN2023/118673, dated Dec. 9, 2023, 3 pages.
First Office Action and search report issued on Dec. 5, 2022 for counterpart Chinese patent application No. 202211315994.7.
Supplemental search report issued on Jan. 3, 2023 for counterpart Chinese patent application No. 202211315994.7.
Wu Jin, Screening and application of drug-eluting stents inpatients with cardiovascular diseases, Zhongguo Zuzhi Gongcheng Yanjiu, vol. 20, No. 38.
Lv Yong-chao et al., Determination of Tacrolimus Tablets by HPLC, Journal of Pharmaceutical Research 2013 vol. 32 , No. 4.
Zhou Jie et al., Preparation and the release characteristic in vitro of arsenic trioxide albumin nanospheres, Chinese Journal of New Drugs 2005, vol. 14 No. 1.
Decision of Rejection issued on Mar. 7, 2025 for counterpart Chinese patent application No. 202310056674.2, with English translation.

* cited by examiner

COBALT-CHROMIUM ALLOY STENT AND DRUG ELUTING STENT

CROSS-REFERENCE TO RELATED APPLICATIONS

The present application is a continuation application of co-pending PCT Patent Application Serial No. PCT/CN2023/118673, filed Sep. 14, 2023, which claims priority to Chinese Patent Application No. 202211315994.7, filed in the China National Intellectual Property Administration on Oct. 26, 2022, and entitled "COBALT-CHROMIUM ALLOY STENT AND DRUG COATED STENT", each of which is incorporated herein by reference in its entirety.

TECHNICAL FIELD

The present invention relates to a cobalt-chromium alloy stent and a drug coated stent and belongs to the technical field of stents.

BACKGROUND ART

As drug eluting stents (DES) have been increasingly used in clinical applications, their excellent clinical efficacy has brought great encouragement to clinicians as well as benefits to patients. Although the first generation of DES effectively inhibits intravascular restenosis rate, endothelial repair is delayed while the proliferation of vascular smooth muscle cells is inhibited effectively, which increases the chance of causing in-stent thrombosis.

At present, the new research and development trend of DES in the domestic and foreign markets focus on improving its construction in three terms: (1) improvement of drug carrier: after a drug stent is inserted into a diseased vessel, the carrier can effectively control the release rate of a drug; (2) improvement of stent delivery system: the delivery and support performance of the stent is improved to help the stent to reach a lesion site smoothly and thus expand accurately and effectively; and (3) innovation of pharmaceutical formulations: it acts to inhibit intimal hyperplasia of a lesion site and effectively reduce the restenosis rate.

For improvements in pharmaceutical preparations, from the first generation of DES-Cypher: rapamycin (Sirolimus) and Taxus: paclitaxel, to the later limus-derivative drugs, as well as the attempt to combine the two drugs and the research and development of the latest antibody stents, researchers are constantly trying to find a safer and more effective drug to meet clinical needs. Wu, Jin from the Renmin Hospital of Wuhan University conducted a search on literatures published from 2010 to 2016 in databases of PubMed and WanFang using the keywords of "drug coated stent, drug eluting stent, rapamycin, paclitaxel, heparin, zotarolimus, everolimus", and screened 30 of the literatures for analysis. The results show that compared with rapamycin, rapamycin derivatives (such as everolimus, zotarolimus or biolimus, tacrolimus and pimecrolimus) have a stronger lipophilicity, thereby facilitating the local action of drugs. Wu, Jin believes that the combined use of drugs and bi-directional drug-releasing stents would be another novel idea for drug coated stents (Screening and Application of Drug-eluting Stents in Patients with Cardiovascular Diseases; Wu, Jin; Chinese Journal of Tissue Engineering Research Vol. 20, No. 38). Therefore, there is an urgent clinical need for arsenic trioxide and tacrolimus mixed drug eluting stents for cardiac interventional therapy.

SUMMARY OF THE INVENTION

In order to solve the above technical problem, an objective of the present invention is to provide a vascular stent and a drug coated stent based on the vascular stent. The vascular stent which uses a special structural design is a thin-beam stent with a high support force and a high flexibility.

To achieve the above objective, the present invention firstly provides a cobalt-chromium alloy stent, including a plurality of body units,
wherein the body units are connected to each other in a tubular form;
each of the body units is composed of a plurality of support rings connected by flexible ribs, and the body units are in the form of a sinusoidal wave;
a body of each of the flexible ribs is a coil spring;
adjacent body units are connected by a plurality of connecting ribs; and
the body of each of the connecting ribs is a coil spring.

According to a specific embodiment of the present invention, preferably, each support ring is in the form of an individual sinusoidal wave, and a plurality of the support rings are combined together such that these individual sine waves are connected together to form a complete sinusoidal wave, i.e., the sinusoidal wave formed of the body units.

According to a specific embodiment of the present invention, preferably, in the cobalt-chromium alloy stent described above, the support rings are connected to each other by the flexible ribs as follows.

A first connecting slot a and a second connecting slot b are respectively defined in two ends of each support ring, a connecting post is defined at each of two ends of the coil spring of the flexible rib, and the two connecting posts of the same flexible rib are respectively connected to the first connecting slot a of one support ring and the second connecting slot b of another support ring.

That is, the first connecting slot a and the second connecting slot b are respectively defined in the two ends of the support ring, each support ring connects two flexible ribs, and the connecting posts at two ends of the flexible rib are respectively inserted into the first connecting slot a of one support ring and the second connecting slot b of another support ring, and the connecting posts at two ends of the flexible rib cannot be inserted into the first connecting slot a and the second connecting slot b of the same support ring.

As another alternative, the coil springs may be welded to the support rings directly.

According to a specific embodiment of the present invention, preferably, in the cobalt-chromium alloy stent described above, the body units are connected to each other by the connecting ribs as follows.

A third connecting slot c is defined in a circular arc of each support ring to be connected, a connecting post is defined at each of two ends of the coil spring of the connecting rib, and the two connecting posts of the same connecting rib are respectively connected to the third connecting slots c of two adjacent support rings.

According to a specific embodiment of the present invention, the connecting ribs and the flexible ribs may have the same structure, except for only the length. The various support rings have the same structure, the first connecting slot a and the second connecting slot b are distinguished only for ease of description, and in practical use, the two may be exchanged.

According to a specific embodiment of the present invention, preferably, in the cobalt-chromium alloy stent described above, all of the connecting ribs are generally spirally distributed, and the number of the generally spirally distributed connecting ribs is 2-4.

According to a specific embodiment of the present invention, preferably, in the cobalt-chromium alloy stent described above, the support ring has a thickness of 90-150 μm and a width of 60-90 μm.

According to a specific embodiment of the present invention, preferably, in the cobalt-chromium alloy stent described above, the flexible rib has a length L1 (L1 as shown in FIG. 2) of 1-5 mm, the connecting posts of the flexible rib each have a diameter of 0.05-0.1 mm and a height of 10-50 μm, and the coil spring has a diameter of 0.1-1 mm.

According to a specific embodiment of the present invention, preferably, in the cobalt-chromium alloy stent described above, the connecting rib has a length L3 (L3 as shown in FIG. 3) of 0.5-2 mm, the connecting posts of the connecting rib each have a diameter of 0.05-0.1 mm and a height of 10-50 μm, and the coil spring has a diameter of 0.1-1 mm.

According to a specific embodiment of the present invention, preferably, in the cobalt-chromium alloy stent described above, the first connecting slot a, the second connecting slot b, and the third connecting slot c each have a diameter of 0.05-0.1 mm and a depth of 10-50 μm.

According to a specific embodiment of the present invention, preferably, in the cobalt-chromium alloy stent described above, a distance L2 (L2 as shown in FIG. 2) between the body units is between 3-10 mm.

According to a specific embodiment of the present invention, preferably, in the cobalt-chromium alloy stent described above, the support ring is made of a cobalt-chromium alloy having the following compositions:

15-26% of chromium, 10-20% of tungsten, 9.0-11.0% of nickel, 3-6% of iron, and the rest being cobalt.

According to a specific embodiment of the present invention, preferably, the cobalt-chromium alloy stent is a vascular stent.

According to a specific embodiment of the present invention, preferably, platinum-tungsten alloy coil springs are used for the flexible ribs and the connecting ribs. A platinum-tungsten alloy has developing properties, with excellent developing properties under radiations, can improve the developing properties of the stent, and facilitate the operations by a surgeon.

The present invention further provides a drug coated stent, comprising the cobalt-chromium alloy stent described above and a drug coating on a surface of the stent, wherein the drug coating contains arsenic trioxide and tacrolimus;

based on the surface area of the cobalt-chromium alloy stent, the content of arsenic trioxide is 3-18 μg/mm$^2$, and the content of tacrolimus is 3-10 μg/mm$^2$.

In the above-mentioned drug coated stent, preferably, the content of arsenic trioxide is 5-15 μg/mm$^2$.

In the above-mentioned drug coated stent, preferably, the content of tacrolimus is 3-5 μg/mm$^2$.

The process of testing the release properties of tacrolimus of the present invention comprises: soaking drug stents in a PBS solution, placing the stents in a shaker (shaking speed of 80 r/min), and taking out the stents at the corresponding time points (1 d, 7 d, 14 d, 21 d, and 28 d) (at least 3 stents for each time point), and testing the concentration of tacrolimus. The content of tacrolimus can be tested using the detection method in "Determination of Tacrolimus Tablets by HPLC" (Lv, Yongchao, Song, Yucai; Journal of Pharmaceutical Research 2013 Vol. 32, No. 4, page 1).

For the drug release properties of the present invention, the release process comprises: soaking drug stents in a PBS solution, placing the stents in a shaker (shaking speed of 100 r/min), and taking out 5 ml of the solution at the corresponding time points (1 d, 7 d, 14 d, 21 d, and 28 d) (at least 3 stents for each time point) for testing. The release of the drug arsenic trioxide is detected using the method disclosed in "Preparation and the Release Characteristic in vitro of Arsenic Trioxide Albumin Nanospheres" (Zhou, Jie, Zeng, Fuqing, Gao, Xiang, Xie, Shusheng, Wei, Shuli, Chinese Journal of New Drugs, pages 54-57).

In the above-described drug coated stent, preferably, arsenic trioxide has a release curve where 30%±20% of arsenic trioxide is released at 1 d, 40%±20% of arsenic trioxide is released at 7 d, and 60%±20% of arsenic trioxide is released at 28 d.

In the above-described drug coated stent, preferably, tacrolimus has a release curve where 40% or more of tacrolimus is released at 1 d.

Animal experiments prove that in the arsenic trioxide and tacrolimus mixed drug eluting stent of the present invention, the release curves of arsenic trioxide and tacrolimus show a long-term effect and a short-term effect, respectively, and according to the adjusted proportions in the formula, the drug releases can be controlled within the required ranges, thereby meeting the needs of clinical applications.

In the combination of arsenic trioxide and tacrolimus of the present invention, arsenic trioxide and tacrolimus have different inhibitory effects on vascular smooth muscle, intima and inflammation (i.e., arsenic trioxide is used to induce the apoptosis of smooth muscle cells (SMC), whereas tacrolimus is used to inhibit inflammatory cells), and the appropriate drug release rates are controlled. The combined long-term effect of the two drugs on vessel walls based on the properties of the two drugs can allow the drugs to be released several hours after stent implantation for a long time, so as to induce the apoptosis of SMC and inhibit tunica intimal hyperplasia and inflammation without affecting endothelial repair, thereby playing a good role in preventing restenosis.

The present invention further provides a method for preparing the above-described drug coated stent, which method comprises the following steps:

dissolving a polymer and tacrolimus in an organic solvent, wherein the concentration of tacrolimus is 6-10 mg/mL and the concentration of the polymer is 20-50 mg/mL; suspending arsenic trioxide particles in an organic solvent, wherein the concentration of arsenic trioxide is 10-30 mg/mL; and then mixing the two solutions, stirring the mixed solution until uniform, uniformly spraying the resulting solution onto the surface of a stent, drying same, and evaporating the solvent to obtain a drug coating.

In the above-mentioned preparation method, the arsenic trioxide, tacrolimus and polymer can be sprayed using a conventional spraying method, for example, the arsenic trioxide spraying techniques disclosed in CN 200510023714.5 and CN 1413594 A, by which drugs are dissolved in solvents and then mixed for spraying.

In the above-mentioned preparation method, preferably, the weight ratio of arsenic trioxide to tacrolimus to the polymer is 2-35:1-10:1-100.

In the above-mentioned preparation method, the two drugs are slowly, sustainedly and stably released and play roles by the decomposition of the polymer, respectively. The polymer used in the present invention may be a biodegradable macromolecular material, preferably, the polymer comprises one of or a combination of two or more of polylactic acid (PLA), glycolic acid (PGA), poly(lactic-co-glycolic acid), and poly(fatty acid dimer-sebacic acid) (PFAD-SA).

In the above-mentioned preparation method, preferably, the organic solvent is selected from one of or a combination of two or more of tetrahydrofuran, dichloromethane, absolute ethanol, trichloromethane, dimethylformamide, and DMSO.

In the above-mentioned preparation method, preferably, in the organic solvent, the content of the polymer is 1%-30% by weight.

The present invention provides a thin-beam stent with a high support force and a high flexibility and in combination with anti-proliferative and anti-inflammatory functional composite drugs to form a single drug coating, and drug interaction control is realized for the single dual-drug coating, thus achieving the sustained release control of individual drugs at the same time. With the joint actions of a good stent design, the functional composite drugs and controlled sustained drug release techniques, the stent performs well in an animal model in which the stent is implanted. The drug coated stent provided in the present invention has the therapeutic effect of preventing restenosis after stenting, and has a higher safety.

The following beneficial effects are brought by the technical solutions of the present invention.

1. The structure of the connecting ribs of the stent enables the stent to have a good ability to pass through a serpentine vessel and greatly improves the flexibility and the performance of the stent to fit an inner wall of the vessel.

2. The developing properties of the stent are improved, which facilitates quick identification of the position of the stent by a surgeon and the visualization of the expansion effect of the stent and saves the surgery time.

3. At present, all commercially available stents use a single drug. According to the present invention, two drugs, i.e., arsenic trioxide and tacrolimus, are used, and the drug release curves of the two composite drugs (ATO/TAC) are adjusted such that the inflammatory response of vascular endothelial cells and the proliferative behavior of vascular smooth muscle cells can be inhibited effectively and the vascular restenosis rate can be reduced.

LIST OF MAIN REFERENCE SIGNS

Figure 1:
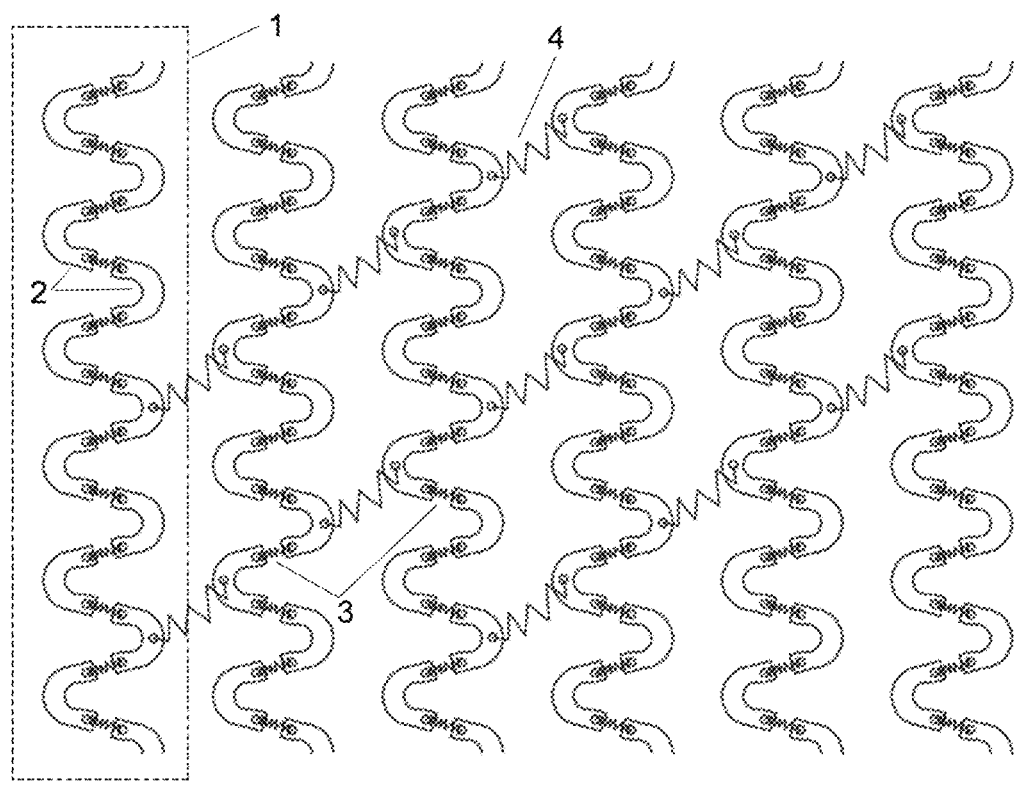
FIG. 1 is a schematic structural diagram of an expanded cobalt-chromium alloy stent according to some specific implementations of the present invention.
Figure 2:
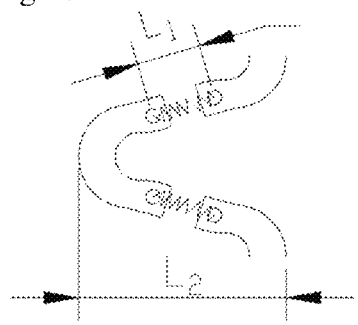
FIG. 2 is a schematic structural diagram of a portion of a cobalt-chromium alloy stent according to some specific implementations of the present invention.
Figure 3:
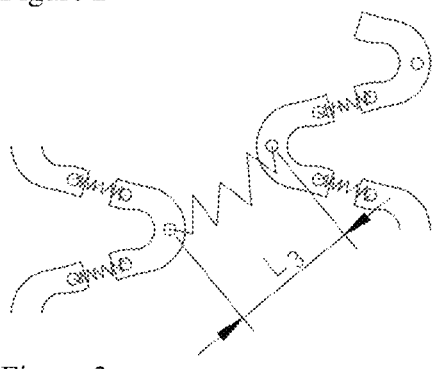
FIG. 3 is a schematic structural diagram of a portion of a cobalt-chromium alloy stent according to some specific implementations of the present invention.

1: Body unit 2: Support ring 3: Flexible rib 4: Connecting rib 5: Platinum-tungsten alloy coil spring 6: Connecting post a: First connecting slot b: Second connecting slot c: Third connecting slot.

DETAILED DESCRIPTION OF EMBODIMENTS

In order to understand the technical features, objectives and beneficial effects of the present invention more clearly, the technical solutions of the present invention are described in detail as below, but cannot be construed as a limitation on the implementable scope of the present invention.

The structure of an expanded cobalt-chromium alloy stent of the present invention is shown in FIG. 1. The cobalt-chromium alloy stent comprises a plurality of body units 1.

The body units 1 are connected to each other in a tubular form.

Each of the body units 1 is composed of a plurality of support rings 2 connected by flexible ribs 3, and the body units 1 are the form of a sinusoidal wave.

Figure 4:
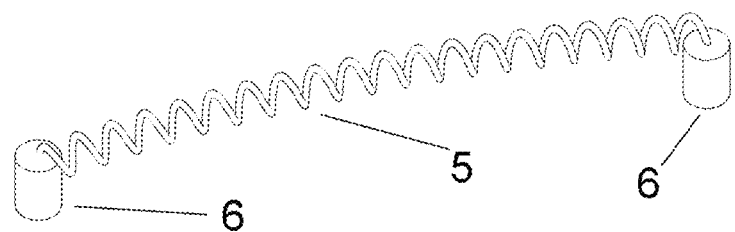
FIG. 4 is a schematic structural diagram of a flexible rib or a connecting rib.

Each of the flexible rib 3 is composed of a platinum-tungsten alloy coil spring 5 and connecting posts 6 (as shown in FIG. 4), and the platinum-tungsten alloy coil spring is welded to the connecting posts.

Adjacent body units 1 are connected by a plurality of connecting ribs 4.

Each of the connecting ribs 4 is composed of a platinum-tungsten alloy coil spring 5 and connecting posts 6 (as shown in FIG. 4), and the platinum-tungsten alloy coil spring is welded to the connecting posts. The connecting rib 4 has the same structure as and a different length than the flexible rib 3.

In some specific embodiments, the support rings are connected to each other by the flexible rib as follows.

Figure 5:
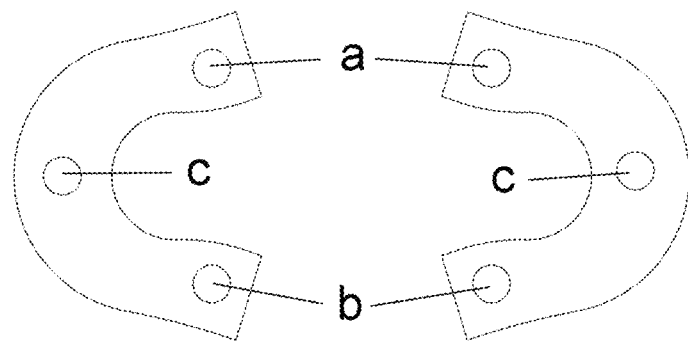
FIG. 5 is a schematic structural diagram of a support ring.

A first connecting slot a and a second connecting slot b are defined respectively in two ends of each support ring 2 (as shown in FIG. 5), the connecting posts 6 are respectively defined at two ends of the platinum-tungsten alloy coil spring 5 of the flexible rib 3, and the two connecting posts 6 of the same flexible rib 3 are respectively connected in the first connecting slot a of one support ring 2 and the second connecting slot b of another support ring 2.

In some specific embodiments, the body units are connected to each other by the connecting ribs as follows.

A third connecting slot c is defined in a circular arc of each support ring 2 to be connected (as shown in FIG. 5), the connecting posts 6 are respectively defined at two ends of the coil spring 5 of the connecting rib 4, and the two connecting posts 5 of the same connecting rib 4 are respectively connected to the third connecting slots c of two adjacent support rings 2.

In some specific embodiments, the number of the connecting ribs between the body units is between 2 and 6. In some specific embodiments, in the cobalt-chromium alloy stent, all of the connecting ribs are generally spirally distributed (as shown in FIG. 1), and the number of spirals is preferably between two and four.

In some specific embodiments, the support ring has a thickness of 90-150 μm and a width of 60-90 μm.

In some specific embodiments, the flexible rib has a length L1 of 1-5 mm, the connecting posts of the flexible rib each have a diameter of 0.05-0.1 mm and a height of 10-50 μm, and the platinum-tungsten alloy coil spring has a diameter of 0.1-1 mm.

In some specific embodiments, the connecting rib has a length L3 of 0.5-2 mm, the connecting posts of the connecting rib each have a diameter of 0.05-0.1 mm and a height of 10-50 μm, and the platinum-tungsten alloy coil spring has a diameter of 0.1-1 mm.

In some specific embodiments, the first connecting slot a, the second connecting slot b, and the third connecting slot c each have a diameter of 0.05-0.1 mm and a depth of 10-50 μm.

In some specific embodiments, a distance L2 between the body units is between 3-10 mm.

In some specific embodiments, the flexible rib and the connecting rib have the same structure, except for the length, and two ends of the flexible rib and two ends of the connecting rib are welded to the connecting posts, as shown in FIG. 4. The diameter of each of the connecting posts is preferably equal to the reference dimension of the diameter of each of the connecting slots. The connecting posts are in clearance fit the connecting slots.

In some specific embodiments, the body of the connecting rib is made of a platinum-tungsten alloy. The platinum-tungsten alloy coil spring has developing properties, with excellent developing properties under radiations, thus improving developing properties of the stent and facilitating the operations by a surgeon. Also, the platinum-tungsten alloy coil spring has an excellent flexibility, significantly improving the performance of the stent reaching a tortuous lesion site through a tortuous vessel.

The support ring of the stent of the present invention is made of a cobalt-chromium alloy, which provides excellent mechanical properties and can meet requirements of the clinical use. In some specific embodiments, the cobalt-chromium alloy has the following compositions: 15-26% of chromium, 10-20% of tungsten, 9.0-11.0% of nickel, 3-6% of iron, and the rest being cobalt.

Example 1

This example provides a cobalt-chromium alloy stent, which is a vascular stent. In the cobalt-chromium alloy stent, troughs and peaks of sinusoidal waves of adjacent body units are connected by the connecting ribs, and the number of the connecting ribs is 2.

The connecting ribs between the body units of the vascular stent are spirally distributed in space and two connecting ribs are provided.

The support ring has a thickness of 90 μm and a width of 60 μm.

The flexible rib has a length of 0.2 mm.

The connecting post has a diameter of 0.05 mm and a height of 50 μm.

The connecting rib has a length of 0.5 mm.

The first connection slot, the second connection slot, and the third connection slot each have a diameter of 0.05 mm and a depth of 50 μm.

The platinum-tungsten alloy coil spring has a diameter of 0.1 mm.

Figure 6:
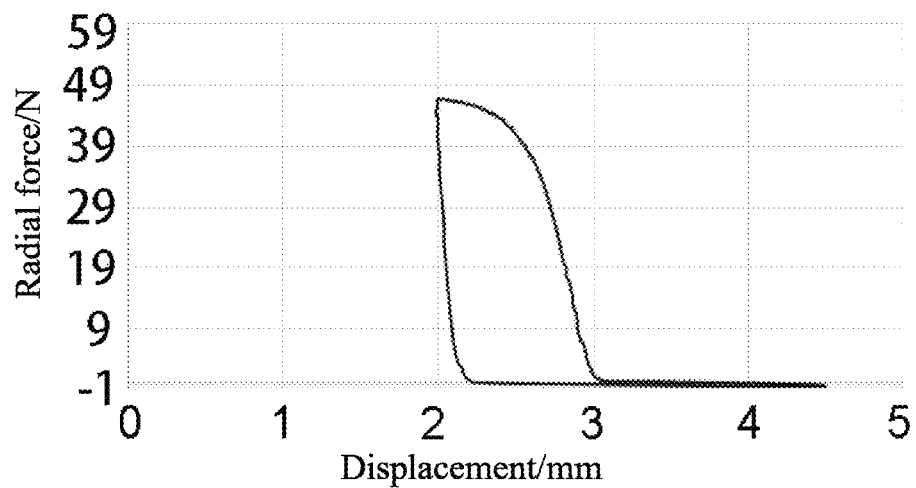
FIG. 6 shows results of a radial crimping resistance test of a cobalt-chromium alloy stent in Example 1.

A radial crimping resistance test was performed on the stent as follows. The stent was first expanded to a diameter at a nominal pressure and placed in a crimper; after parameters are adjusted, the outer diameter of the vascular stent was pressed radially such that the outer diameter of the vascular stent was changed to 90% of the outer diameter, and at this point, a radial support force curve was obtained for calculation of a radial support force. The results of the test are shown in FIG. 6. The body of the vascular stent provided in this embodiment is made of a cobalt-chromium alloy, which provides excellent mechanical properties and can meet requirements of the clinical use. As can be seen from FIG. 6, the cobalt-chromium alloy stent of this example has a high radial support force.

Example 2

This example provides a cobalt-chromium alloy stent, which is a vascular stent. In the cobalt-chromium alloy stent, troughs and peaks of sinusoidal waves of adjacent body units are connected by the connecting ribs, and the number of the connecting ribs is 3.

The connecting ribs in an axial direction of the vascular stent are spirally arranged in space and three connecting ribs are provided.

The support ring has a thickness of 120 μm and a width of 90 μm.

The support ring has a thickness of 90 μm and a width of 60 μm.

The flexible rib has a length of 0.5 mm.

the connecting post has a diameter of 0.08 mm and a height of 50 μm.

The connecting rib has a length of 1 mm.

The first connection slot, the second connection slot, and the third connection slot each have a diameter of 0.08 mm and a depth of 50 μm.

The platinum-tungsten alloy coil spring has a diameter of 0.5 mm.

Figure 7:
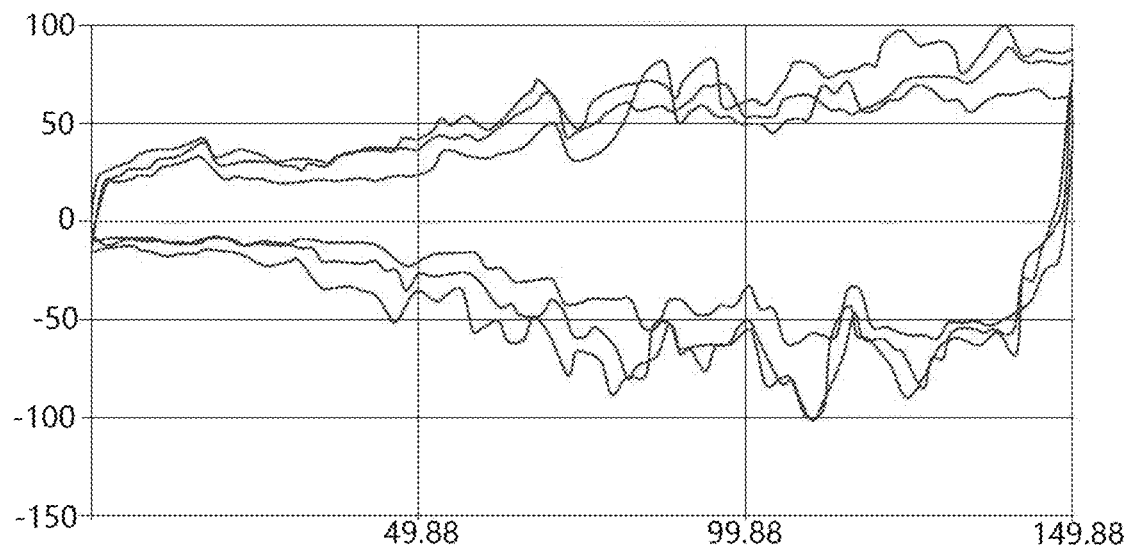
FIG. 7 shows results of a vascular passability test of a cobalt-chromium stent in Example 2.

The stent was tested for its passability in a vascular model as follows. One end of a catheter holder of a stent system was connected to a pusher, the other end (with a vascular stent) was pushed into a vascular model (vascular model ASTM F2394-2004), the vascular model was subjected to the passability test at a water temperature of 37±2° C., pushing and retracting are simulated, and the test was performed three times consecutively, to obtain a push force curve of the vascular stent in the vascular model. The results of the test are shown in FIG. 7. It can be seen from FIG. 7 that the push force on the stent is greatly reduced, indicating that the stent has excellent flexibility and the stent has a good ability to pass through a serpentine blood vessel.

Comparative Example 1

This comparative example 1 provides a cobalt-chromium alloy stent, the entire stent is cut and shaped by a laser cutting machine, has a significantly less flexible than the stent structure of the present invention.

Figure 8:
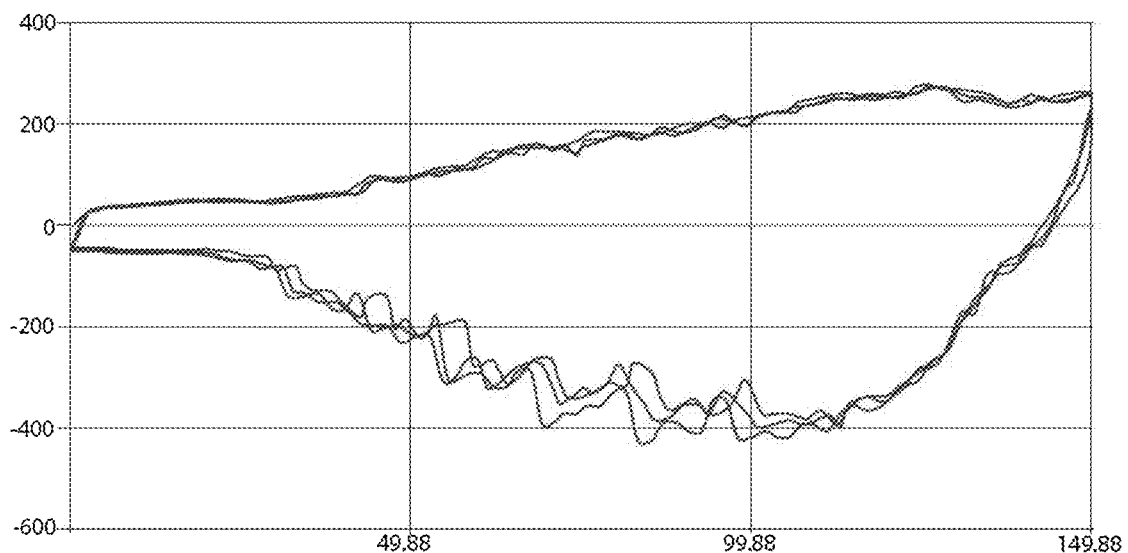
FIG. 8 shows results of a vascular passability test of a cobalt-chromium stent in Comparative Example 1.

The stent was tested for its passability in the vascular model for three times consecutively. The results are shown in FIG. 8. It can be seen from FIG. 8 that the push force on the stent is high, indicating that the stent has a poor flexibility and the stent has a poor ability to pass through a serpentine blood vessel.

Test Example 1

The range of drug concentrations at which ATO and TAC were friendly to vascular endothelial cell viability was determined at the cellular level.

Figure 9:
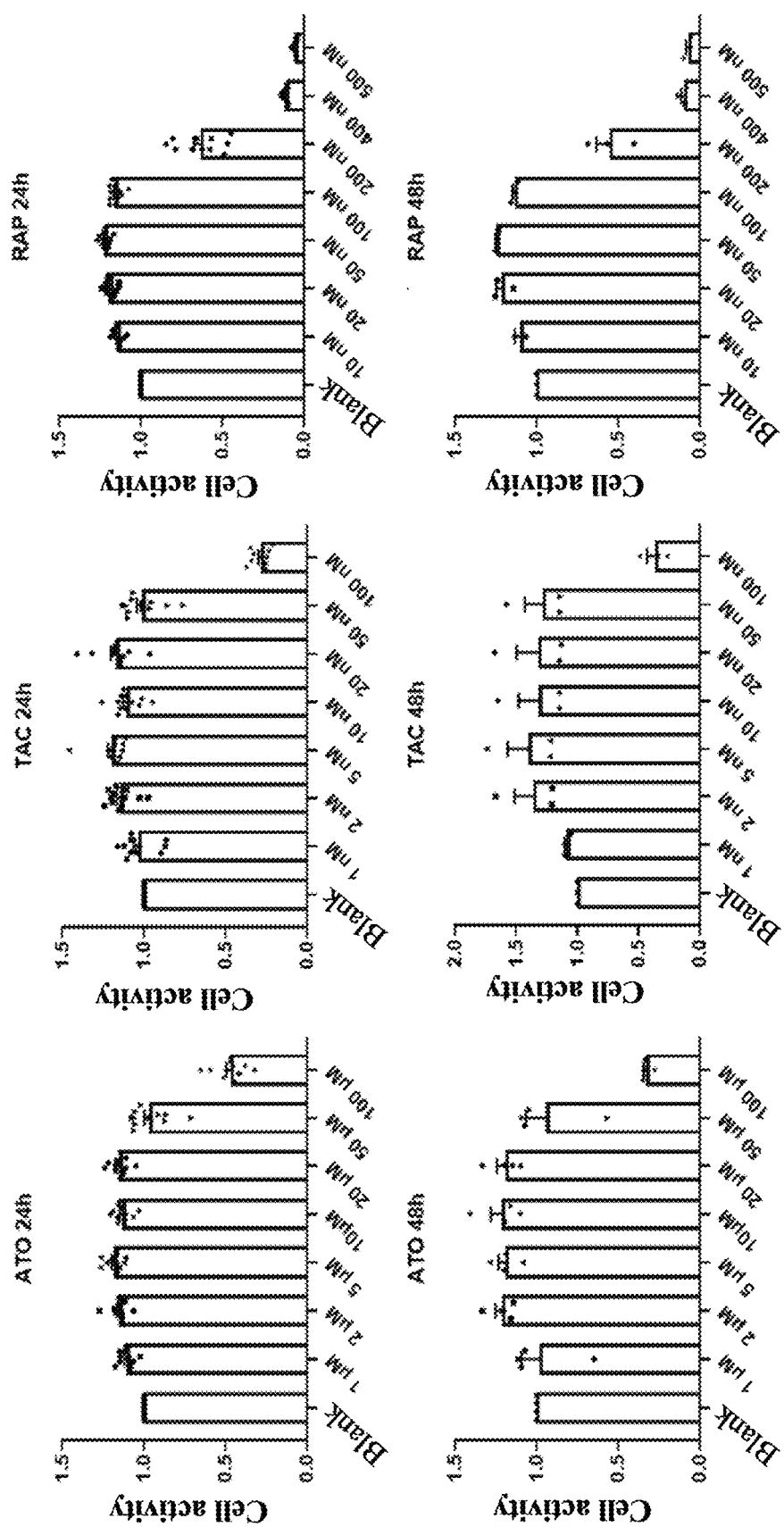
FIG. 9 shows results of a concentration range test of different drugs friendly to vascular endothelial cell activity.

The changes in the cell viability of vascular endothelial cells (HUVECs) under the action of ATO, TAC and rapamycin (RAP) at different concentrations for 24 h and 48 h were studied by CCK-8 cell viability assay, respectively. ATO at a concentration of 20 μM or less, TAC at a concentration of 50 nM or less and RAP at a concentration of 100 nM or less were found to have no significant effect on the cell viability of vascular smooth muscle cells (HASMCs), as shown in FIG. 9.

The test shows that ATO is friendly to vascular endothelial cells and is used at a wide range of concentrations.

Test Example 2

The range of drug concentrations at which ATO and TAC were friendly to vascular smooth muscle cell viability was determined at the cellular level.

Figure 10:
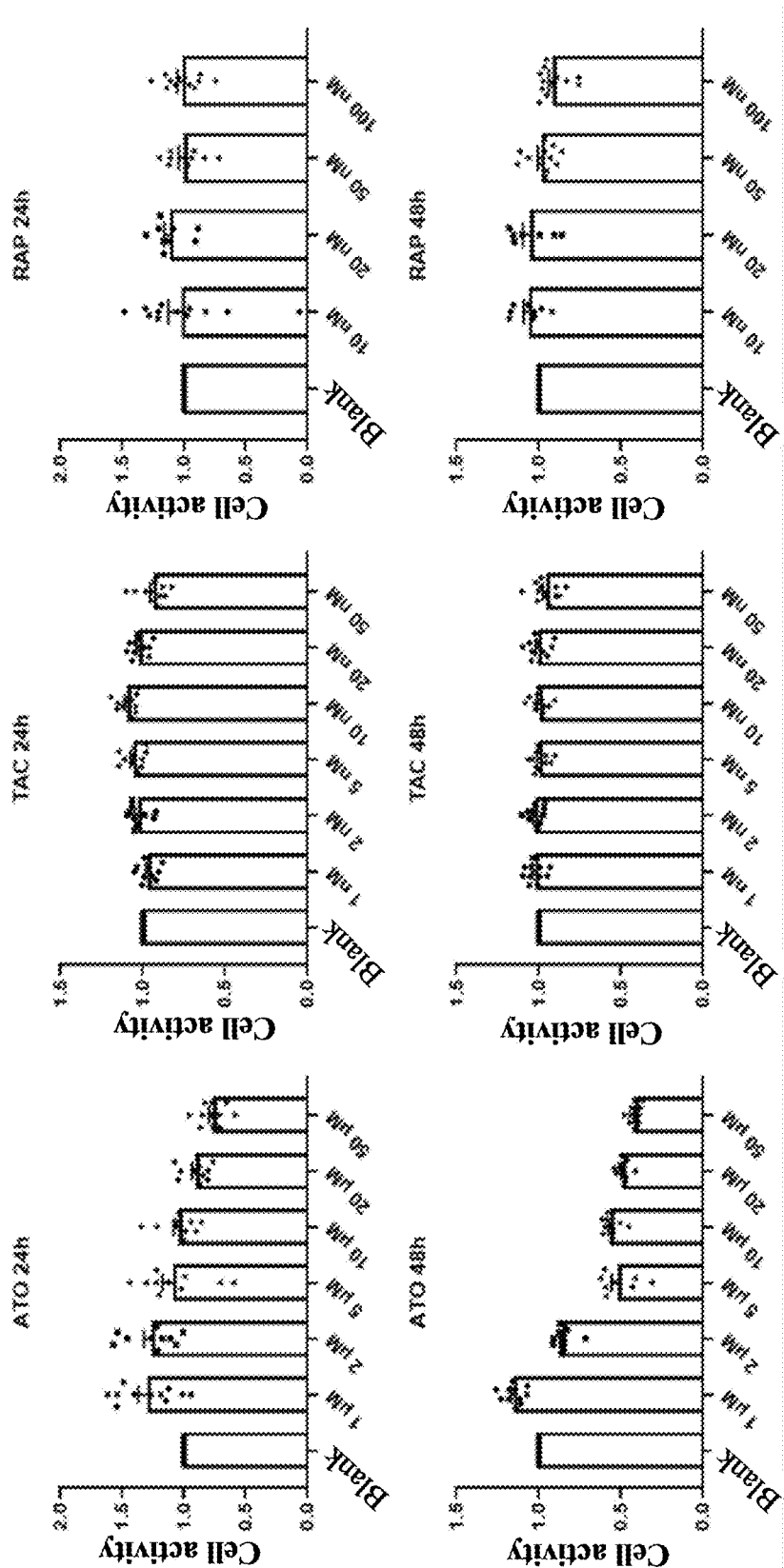
FIG. 10 shows results of an effective concentration range test of different drugs to inhibit vascular smooth muscle cell activity.

The changes in the cell viability of vascular smooth muscle cells (HASMCs) under the action of ATO, TAC and rapamycin (RAP) at different concentrations for 24 h and 48 h were studied by CCK-8 cell viability assay, respectively. ATO at a concentration of 2 μM or more was found to produce a significant inhibitory effect on the cell viability of HASMCs. However, both TAC and RAP at different concentrations had no significant inhibitory effect on the viability of vascular smooth muscle cells (as shown in FIG. 10).

The test shows that ATO can effectively inhibit the proliferation of vascular smooth muscle cells; whereas both TAC and RAP at different concentrations have no significant inhibitory effect on the viability of vascular smooth muscle cells.

Test Example 3

The range of effective concentrations at which TAC inhibited the inflammatory response of vascular endothelial cells was verified at the cellular level.

Figure 11:
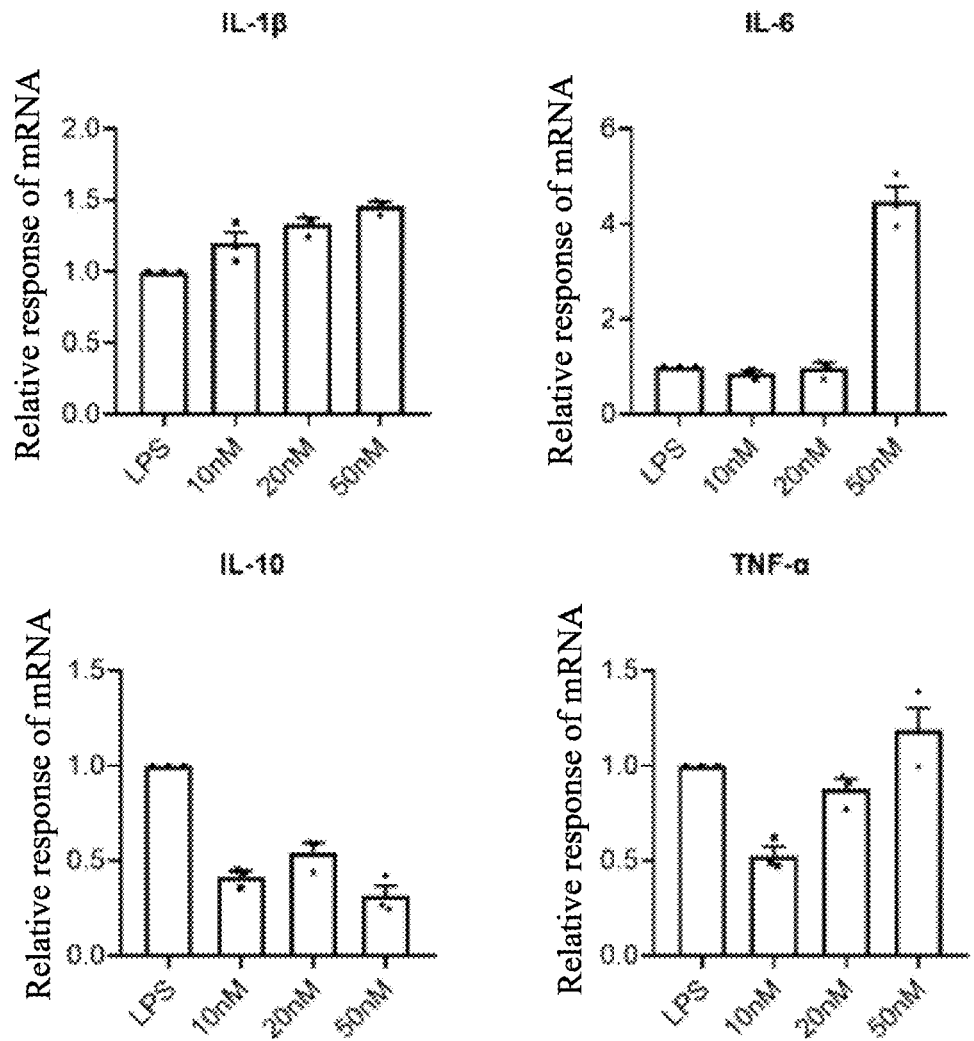
FIG. 11 shows results of an effective concentration range test of TAC to inhibit the inflammatory responses of vascular endothelial cells.

After induction of HUVECs with LPS at a concentration of 1 μg/ml for 6 h, the inhibitory effects of TAC at different concentrations on the inflammatory response of HUVECs were detected by PCR. The experimental results show that 10 nM TAC can effectively reduce the gene expression levels of cellular inflammatory factors IL-6, IL-10 and TNF-α (as shown in FIG. 11).

The test shows that TAC can effectively inhibit the inflammatory response of vascular endothelial cells.

According to the results of Test example 1-Test example 3, ATO can effectively inhibit the proliferation of vascular smooth muscle cells, whereas TAC can effectively inhibit the inflammatory response of vascular endothelial cells, but cannot effectively inhibit the proliferation of vascular smooth muscle cells. The study results preliminarily prove the necessity of composite drugs (ATO/TAC), that is, 1 d after implantation, i.e., when inflammation was most severe, the drug TAC was used to inhibit the inflammatory response of vascular endothelial cell; and the drug ATO was simultaneously used and was effective in inhibiting the proliferation of vascular smooth muscle cells for a long time. The appropriate drug release curves were obtained by adjustment, for example, arsenic trioxide: 30%±20% of arsenic trioxide was released at 1 d, 40%±20% of arsenic trioxide was released at 7 d, and 60%±20% of arsenic trioxide was released at 28 d; and tacrolimus: 40% or more of tacrolimus was released at 1 d. Good effects were also obtained in animal experiments.

Comparison Test of Dual Drug Release Control of Single-Layer Dual-Drug-Coating Structure Example 3-1

Figure 12:
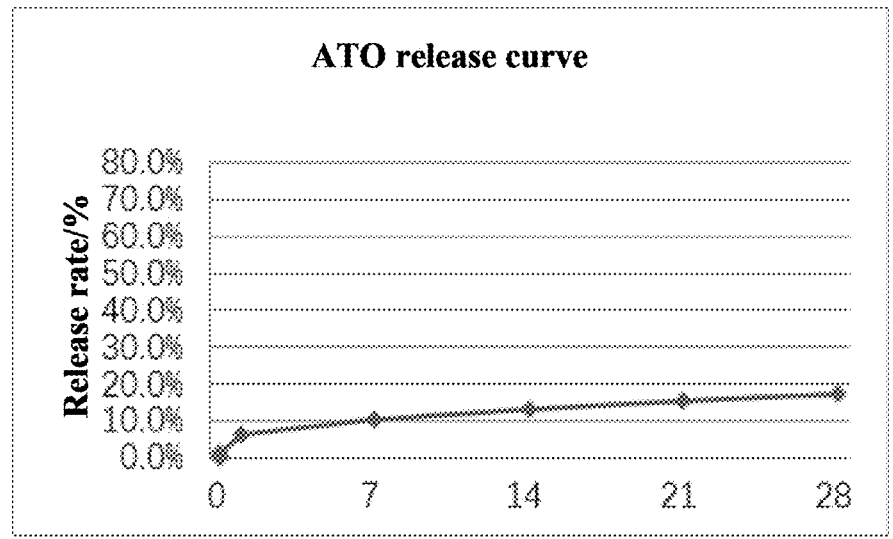
FIG. 12 shows results of release of an arsenic trioxide drug in Example 3-1.

0.10 g of arsenic trioxide was suspended in 10 mL of absolute ethanol; 0.10 g of polymer (PDLA, the same as the polymer in the following examples) was dissolved in 10 mL of tetrahydrofuran solution; and the two solutions were then mixed and completely stirred until uniform. The mixed solution was uniformly sprayed onto the surface of stents using an ultrasonic spraying device with the amount of the drug applied to the surface of each stent being 7-15 μg/mm$^2$, and drying was performed under vacuum for 36 hours or more to obtain ATO mixed drug eluting stents. The results of the drug release of arsenic trioxide in the stents are as shown in FIG. 12.

Example 3-2

0.10 g of arsenic trioxide was suspended in 10 mL of absolute ethanol; 0.05 g of polymer was dissolved in 10 mL of tetrahydrofuran solution; and the two solutions were then mixed and completely stirred until uniform. The mixed solution was uniformly sprayed onto the surface of stents using an ultrasonic spraying device with the amount of the drug applied to the surface of each stent being 5.25-11.25 μg/mm$^2$, and drying was performed under vacuum for 36 hours or more to obtain ATO mixed drug eluting stents. The results of the drug release of arsenic trioxide in the stents are as shown in FIG. 13.

Example 3-3

0.10 g of arsenic trioxide was suspended in 10 mL of absolute ethanol; 0.01 g of polymer was dissolved in 10 mL of tetrahydrofuran solution; and the two solutions were then mixed and completely stirred until uniform. The mixed solution was uniformly sprayed onto the surface of stents using an ultrasonic spraying device with the amount of the drug applied to the surface of each stent being 3.85-8.25 μg/mm$^2$, and drying was performed under vacuum for 36 hours or more to obtain ATO mixed drug eluting stents. The results of the drug release of arsenic trioxide in the stents are as shown in FIG. 14.

Figure 13:
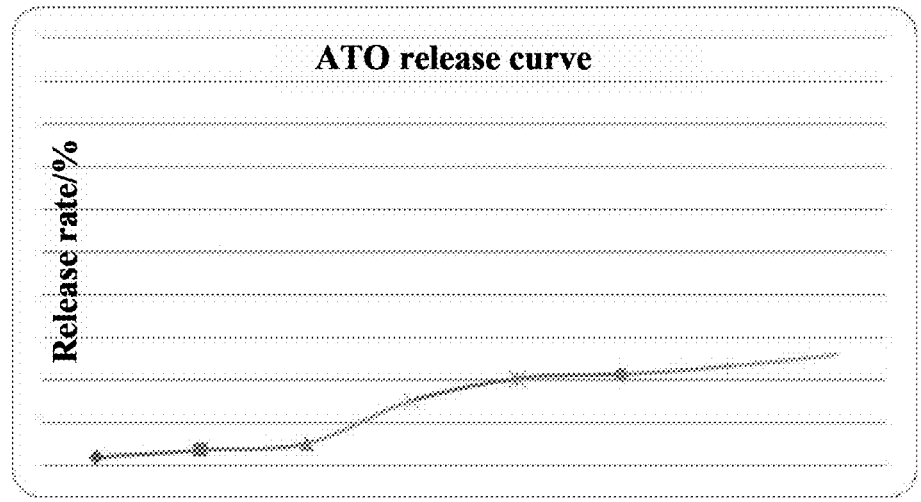
FIG. 13 shows results of release of an arsenic trioxide drug in Example 3-2.
Figure 14:
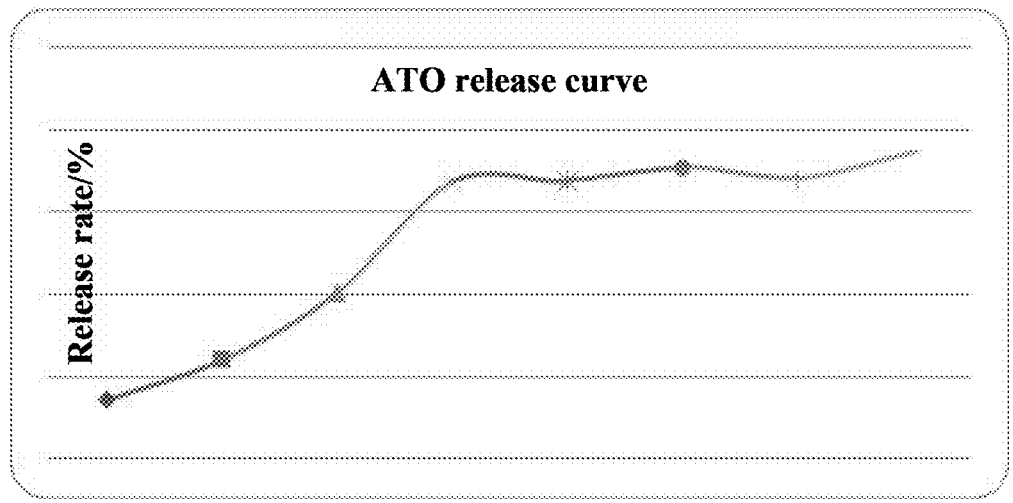
FIG. 14 shows results of release of an arsenic trioxide drug in Example 3-3.

From Examples 3-1, 3-2 and 3-3 and a comparison of FIG. 12-FIG. 14, it can be seen that, simply adjusting the ratio of the drug to the polymer cannot achieve a slow release process, i.e., when the content of the drug is not much different from that of the polymer, the drug release process is extremely slow; and when the content of the drug is much different from that of the polymer, the drug release process is a burst release, neither of which is an ideal drug release. The ideal drug release process is, for example, 40% of the drug is released at 1 d, 60% of the drug is released at 7 d, and 80% or more of the drug is released at 28 d.

Example 3-4

Figure 15:
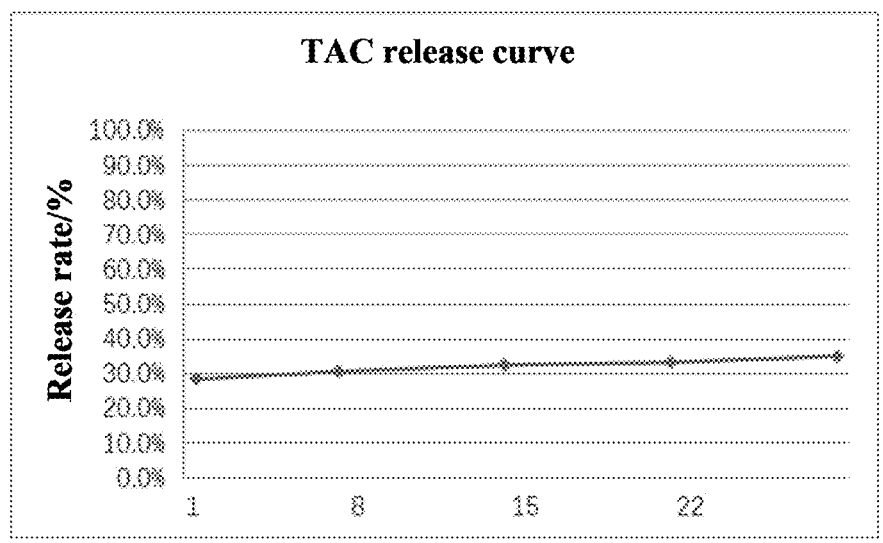
FIG. 15 shows results of release of a TAC drug in Example 3-4.

0.05 g of tacrolimus was dissolved in 10 mL of absolute ethanol; 0.10 g of polymer was dissolved in 10 mL of tetrahydrofuran solution, and then stirred until uniform; and the two solutions were then mixed and completely stirred until uniform. The mixed solution was uniformly sprayed onto the surface of stents using an ultrasonic spraying device with the amount of the drug applied to the surface of each stent being 5.25-11.25 $\mu g/mm^2$, and drying was performed under vacuum for 36 hours or more to obtain TAC mixed drug eluting stents. The results of the drug release of TAC in the stents are as shown in FIG. 15.

From a comparison of Examples 3-1, 3-2 and 3-3 to Example 3-4, it can be seen that the release results for arsenic trioxide and tacrolimus after mixing with the polymer almost have no difference, indicating that the mixing of either drug with the polymer alone cannot yield an ideal drug release curve.

Example 3-5

Figure 16:
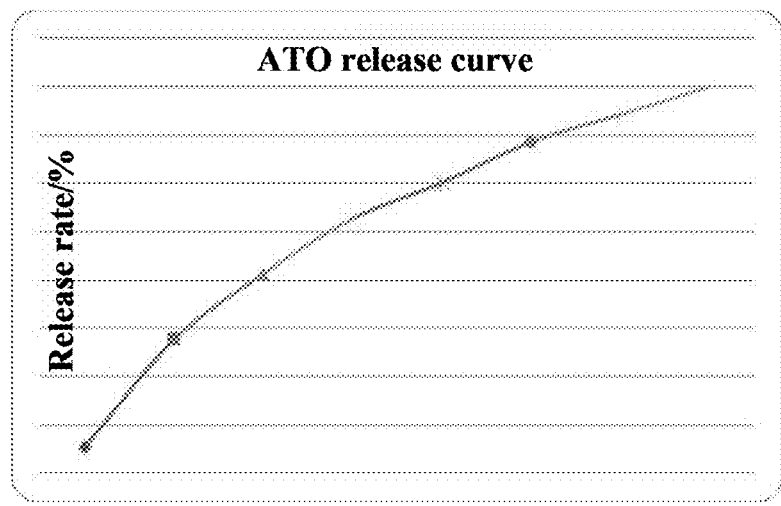
FIG. 16 shows results of release of an arsenic trioxide drug in Example 3-5.
Figure 17:
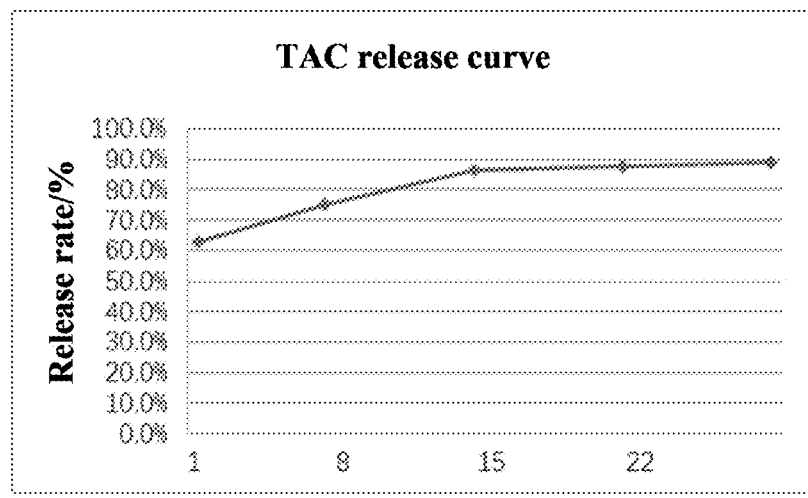
FIG. 17 shows results of release of a TAC drug in Example 3-5.

0.14 g of arsenic trioxide was suspended in 10 mL of absolute ethanol; 0.05 g of tacrolimus and 0.10 g of polymer were dissolved in 10 mL of tetrahydrofuran solution, and then stirred until uniform; and the two solutions were then mixed, and completely stirred until uniform, the mixed solution was uniformly sprayed onto the surface of stents using an ultrasonic spraying device with the amount of the drug applied to the surface of each stent being 10.15-21.75 $\mu g/mm^2$, and drying was performed under vacuum for 36 hours or more to obtain ATO and TAC mixed drug eluting stents. The release results are as shown in FIG. 16 and FIG. 17.

Example 3-6

Figure 18:
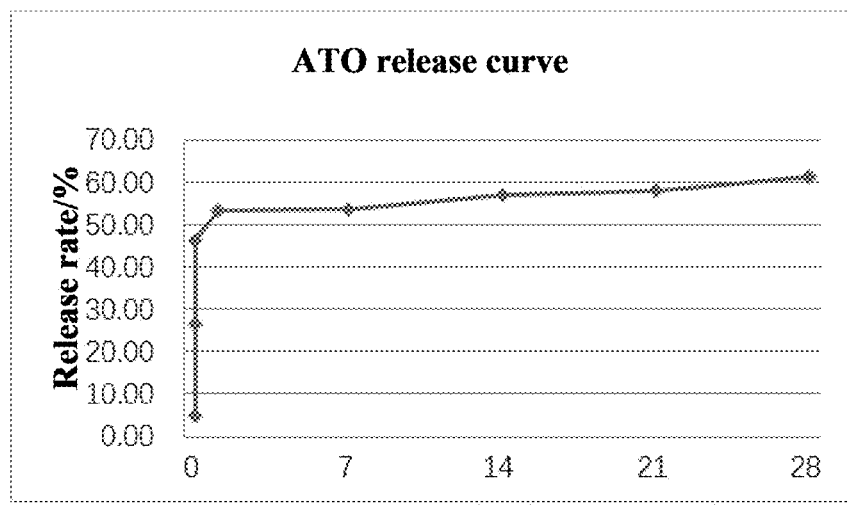
FIG. 18 shows results of release of an arsenic trioxide drug in Example 3-6.
Figure 19:
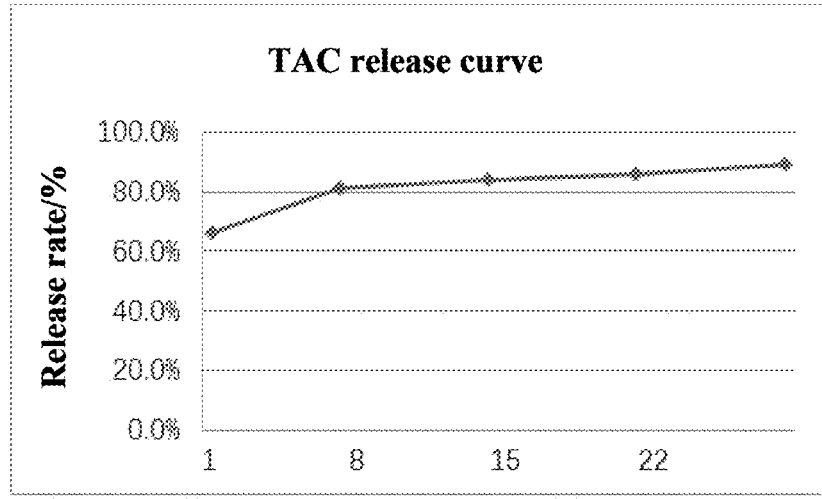
FIG. 19 shows results of release of a TAC drug in Example 3-6.

0.10 g of arsenic trioxide was suspended in 10 mL of absolute ethanol; 0.05 g of TAC and 0.10 g of polymer were dissolved in 10 mL of tetrahydrofuran solution, and then stirred until uniform; and the two solutions were then mixed and completely stirred until uniform. The mixed solution was uniformly sprayed onto the surface of stents using an ultrasonic spraying device with the amount of the drug applied to the surface of each stent being 8.75-18.75 $\mu g/mm^2$, and drying was performed under vacuum for 36 hours to obtain ATO and TAC mixed drug eluting stents. The release results are as shown in FIG. 18 and FIG. 19.

Example 3-7

Figure 20:
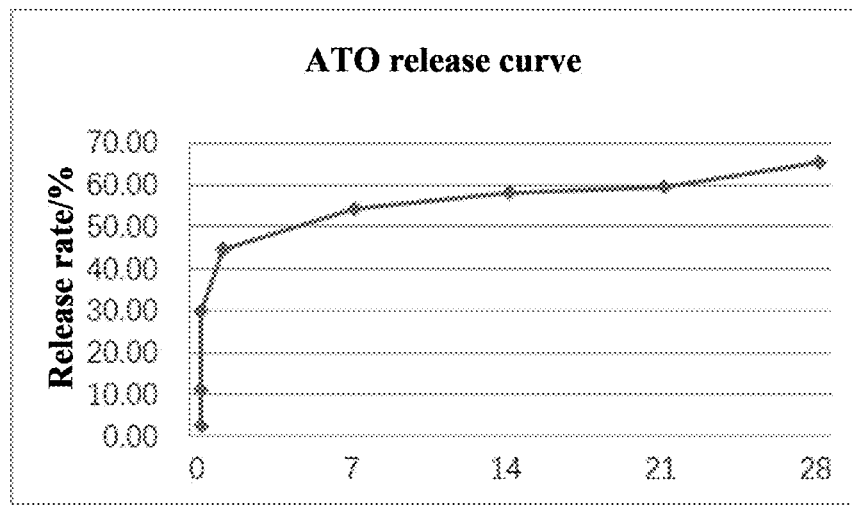
FIG. 20 shows results of release of an arsenic trioxide drug in Example 3-7.
Figure 21:
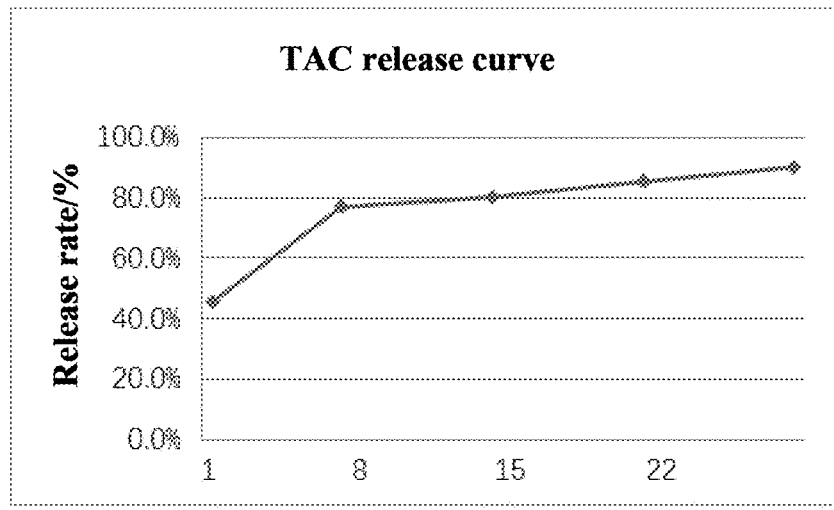
FIG. 21 shows results of release of a TAC drug in Example 3-7.

0.10 g of arsenic trioxide was suspended in 10 mL of absolute ethanol; 0.10 g of TAC and 0.20 g of polymer were dissolved in 10 mL of tetrahydrofuran solution, and then stirred until uniform; and the two solutions were then mixed and stirred until uniform. The mixed solution was uniformly sprayed onto the surface of stents using an ultrasonic spraying device with the amount of the drug applied to the surface of each stent being 14-30 $\mu g/mm^2$, and drying was performed under vacuum for 36 hours to obtain ATO and TAC mixed drug eluting stents. The release results are as shown in FIG. 20 and FIG. 21.

From a comparison of the results of Examples 3-1, 3-2 and 3-3 to the results of Examples 3-4, 3-5, 3-6 and 3-7, it can be seen that the release curve is relatively flat when a single drug is mixed with the polymer, indicating that an ideal drug release curve cannot be designed. However, after the two drugs are mixed, each of the two drugs promotes the release of another drug. By analysis, the possible reason is that the two drugs differ greatly in the molecular weight (the molecular weight of tacrolimus: 822.033, the molecular weight of arsenic trioxide: 197.84), and the molecular structure of tacrolimus is a macrolide, so that when tacrolimus is partially released, it brings channels to the small molecule arsenic trioxide so as to allow the release of arsenic trioxide, and vice versa. On the basis of the choice of the ratio and the combination with the polymer, the ideal drug release curves are finally obtained.

Results of Animal Experiments

Figure 22:
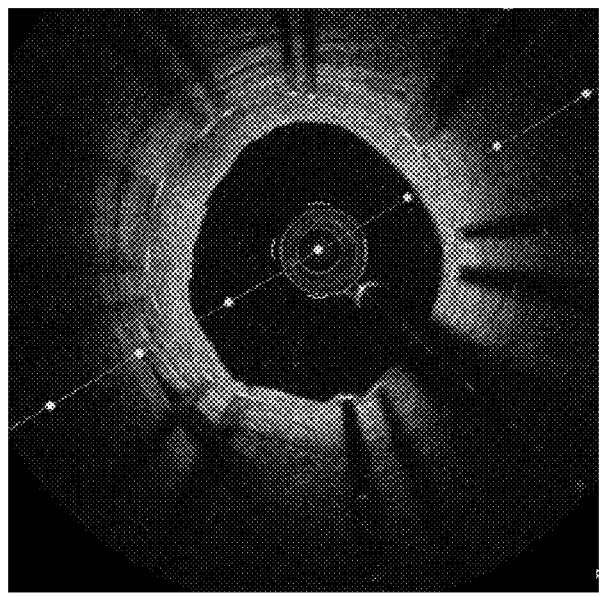
FIG. 22 shows an image of results of intravascular OCT of a stent in Example 3-1.

The drug was applied according to the solution of Example 3-1 to coat on a cobalt-chromium stent substrate for animal experiments. The results of animal experiments were obtained after three months. The angiography showed an unobstructed blood flow without stenosis; and OCT showed that endothelialization was completed, the intima completely covered the stent, and the intima was thick. The intravascular OCT results are as shown in FIG. 22.

Figure 23:
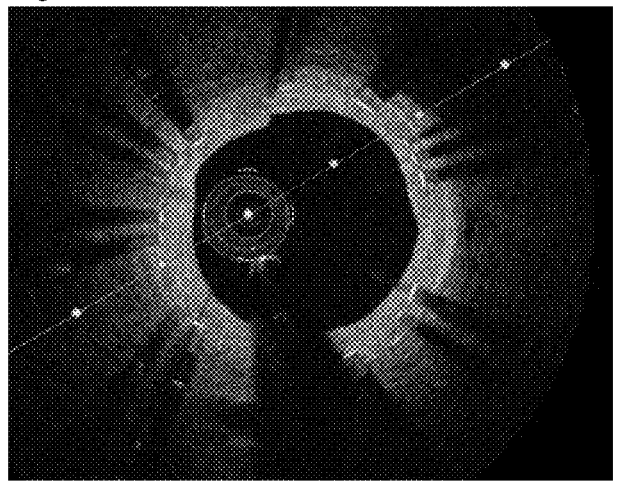
FIG. 23 shows an image of results of intravascular OCT of a stent in Example 3-4.

The drug was applied according to the solution of Example 3-4 to coat on a cobalt-chromium stent substrate for animal experiments. The results of animal experiments were obtained after three months. The angiography showed an unobstructed blood flow without stenosis; and OCT showed that endothelialization was completed, the intima completely covered the stent, and the intima was thick. The intravascular OCT results are as shown in FIG. 23.

Figure 24:
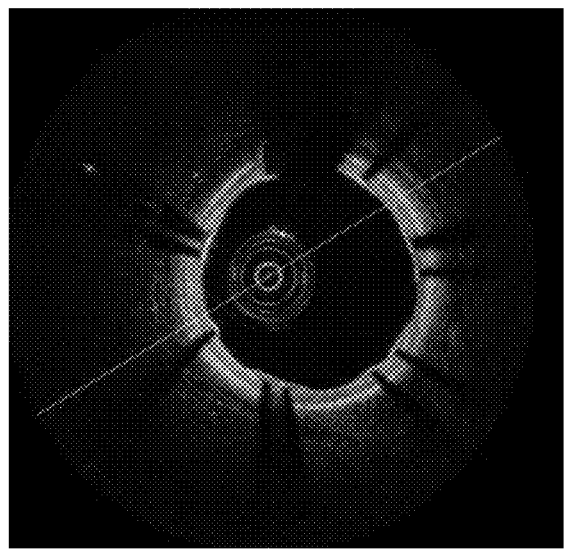
FIG. 24 shows an image of results of intravascular OCT of a stent in Example 3-5.

The drug was applied according to the solution of Example 3-5 to coat on a cobalt-chromium stent substrate for animal experiments. The results of three-month animal experiments show that the tunica intimal thickness was 212±146 $\mu m$. The intravascular OCT results are as shown in FIG. 24. The endothelial coverage on the surface of the stent was intact, the tunica intima, tunica media and tunica adventitia were clear, and no significant inflammatory response was found.

In summary, in view of the results of the animal experiments, in terms of drugs, the results of cellular studies and animal experiments are consistent, which further proves that the effect of the two drugs after compounding is better, that is, ATO+TAC play an enhanced role in inhibiting smooth muscle and intimal hyperplasia. In terms of stents, the cobalt-chromium stent has a large supporting force, a thinner wall thickness, a smaller outer diameter, and significantly improved flexibility and passage. The combination of the stent substrate and the drug coating leads to good results in the animal experiments.

The invention claimed is:
1. A cobalt-chromium alloy stent, comprising a plurality of body units;
   wherein the body units are connected to each other to become tubelike;

each of the body units is composed of a plurality of support rings connected by flexible ribs, and the body units are in the form of a sinusoidal wave;

a body of each of the flexible ribs is a coil spring;

adjacent body units are connected by a plurality of connecting ribs; and a body of each of the connecting ribs is a coil spring;

wherein the support rings are connected to each other by the flexible ribs as follows: a first connecting slot (a) and a second connecting slot (b) are respectively provided in two ends of each support ring, a connecting post is provided at each of two ends of the coil spring of the flexible rib, and two connecting posts of the same flexible rib are respectively connected to the first connecting slot (a) of one support ring and the second connecting slot (b) of another support ring;

wherein the body units are connected to each other by the connecting ribs as follows: a third connecting slot (c) is provided in an arc of each support ring to be connected, a connecting post is provided at each of two ends of the coil spring of the connecting rib, and two connecting posts of the same connecting rib are respectively connected to the third connecting slots (c) of two adjacent support rings;

wherein the connecting rib has a length (L3) of 0.5-2 mm, the connecting post of the connecting rib has a diameter of 0.05-0.1 mm and a height of 10-50 μm, and the coil spring of the connecting rib has a diameter of 0.1-1 mm.

2. The cobalt-chromium alloy stent according to claim 1, wherein in the cobalt-chromium alloy stent, all of the connecting ribs are distributed in the form of general helix, and the number of the general helix distributed in the connecting ribs is 2-4.

3. The cobalt-chromium alloy stent according to claim 1, wherein the support ring has a thickness of 90-150 μm and a width of 60-90 μm.

4. The cobalt-chromium alloy stent according to claim 1, wherein the flexible rib has a length (L1) of 1-5 mm, the connecting post of the flexible rib has a diameter of 0.05-0.1 mm and a height of 10-50 μm, and the coil spring of the flexible rib has a diameter of 0.1-1 mm.

5. The cobalt-chromium alloy stent according to claim 1, wherein the first connecting slot (a), the second connecting slot (b), and the third connecting slot (c) each have a diameter of 0.05-0.1 mm and a depth of 10-50 μm.

6. The cobalt-chromium alloy stent according to claim 1, wherein a distance (L2) between the body units is 3-10 mm.

7. The cobalt-chromium alloy stent according to claim 1, wherein the cobalt-chromium alloy has a composition of:
15-26% of chromium, 10-20% of tungsten, 9.0-11.0% of nickel, 3-6% of iron, and the rest being cobalt.

8. The cobalt-chromium alloy stent according to claim 1, wherein the cobalt-chromium alloy stent is a vascular stent.

9. The cobalt-chromium alloy stent according to claim 1, wherein the coil spring is a platinum-tungsten alloy coil spring.

* * * * *